William F. MacGlashan, Jr.
Harry E. Cotrill, Jr.,
INVENTORS.

Oct. 8, 1968   W. F. MacGLASHAN, JR., ETAL   3,404,562
HIGH-STRAIN-RATE TESTER
Filed Jan. 19, 1966                                    3 Sheets-Sheet 2

William F. MacGlashan, Jr.
Harry E. Cotrill, Jr.,
    INVENTORS.
    Harry M. Saragovitz
BY  Edward J. Kelly
    Herbert Berl
    James T. Deaton Oct. 8, 1968  W. F. MacGLASHAN, JR., ETAL  3,404,562
HIGH-STRAIN-RATE TESTER
Filed Jan. 19, 1966  3 Sheets-Sheet 3

William F. MacGlashan, Jr.
Harry E. Cotrill, Jr.,
INVENTORS.

BY Harry M. Saragovitz
Edward J. Kelly
Herbert Berl
James T. Deaton

United States Patent Office 3,404,562
Patented Oct. 8, 1968

3,404,562
HIGH-STRAIN-RATE TESTER
William F. MacGlashan, Jr., Pasadena, and Harry E. Cotrill, Jr., La Canada, Calif., assignors, by mesne assignments, to the United States of America as represented by the Secretary of the Army
Filed Jan. 19, 1966, Ser. No. 521,752
3 Claims. (Cl. 73—97)

ABSTRACT OF THE DISCLOSURE

A device for exerting a constant strain rate on a specimen wherein pressure applied to one side of a piston forces a non-compressible fluid on the other side of the piston through capillary tubes, a variable orifice, and a quick dump valve to obtain the constant strain rate.

This invention relates to a high-strain-rate tester to be used in testing the tensile strength of materials. More specifically, it relates to those materials used under circumstances where the straining force is placed on them at an extremely high rate of travel, and this rate of travel is reached and stabilized within milliseconds.

It has been realized for quite some time that some materials exhibit quite different tensile-strength characteristics under the above mentioned conditions than they do under the same strain at much slower strain rates. Thus, a high-strain-rate tester is needed to study the tensile-strength characteristics of these materials.

Therefore, it is an object of this invention to provide a strain-rate tester that can be used to test at high or low strain rates.

Therefore, it is an object of this invention to provide a strain-rate tester that can be used to test at high or low strain rates.

Another object of this invention is to provide a high-strain tester that utilizes a noncompressible fluid with a capillary bundle to cause the total generated strain to be reached and stabilized within milliseconds.

A further object of this invention is to provide a high-strain-rate tester that uses a quick-dump valve that is so placed in the system as to substantially eliminate disturbances of the readings desired.

A still further object of this invention is to provide a strain tester that has a especially fabricated specimen holding means.

In accordance with this invention, a high-strain-rate tester is provided that is capable of producing a twenty thousand pound straining force with the strain rate made constant by extruding non-compressible fluid medium through a capillary tube bundle damping unit. This tester has a two millisecond rise time to a velocity which remains constant throughout the test and includes an orifice selector for selecting strain rates between twenty and twenty thousand inches per minute.

In the accompanying drawing forming a part of this specification, and in which like numerals are employed to designate corresponding parts throughout the same:

Figure 1:
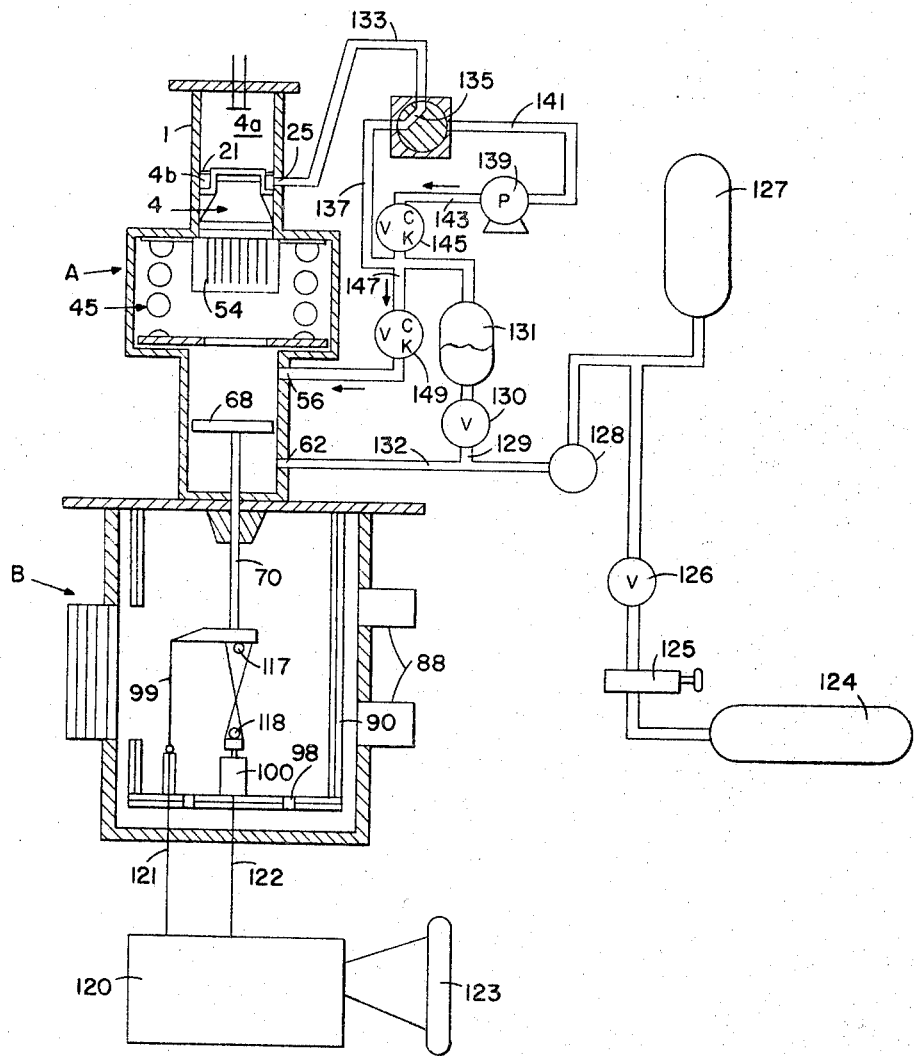
FIGURE 1 is a schematic view illustrating a high-strain-rate tester according to this invention.

Referring now to FIGURE 1 wherein a complete strain-generating machinery and related specimen-holding box are illustrated, valve end A will be considered the upper end and the specimen-holding box end B will be considered the lower end of the strain gage.

Figure 2A:
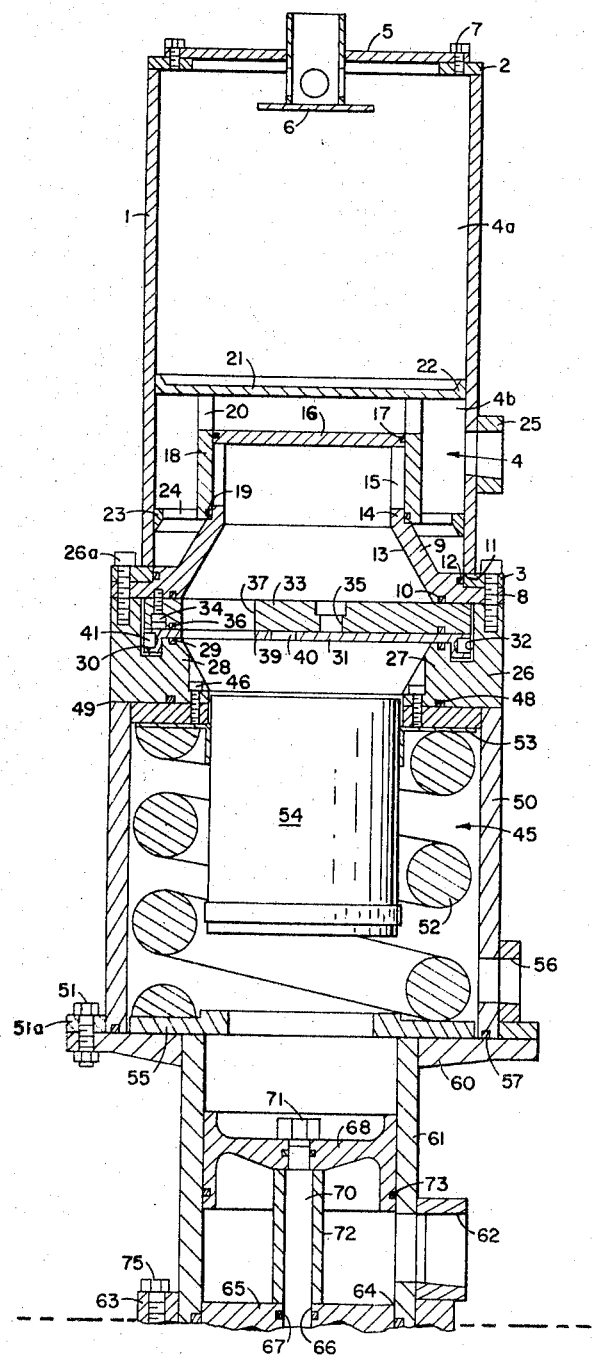
FIGURE 2A is a sectional view showing detailed construction of strain-generating machinery according to this invention.

Referring to the upper end, a cylinder-like valve housing 1, having an inwardly disposed flange 2 (see FIG. 2A) on its uppermost extremity and an outwardly disposed flange 3 on its lower extremity, houses a quick-dump valve assembly 4. A disc-like head plate 5, having an axially disposed tubular-like vent 6 centrally placed therein, closes the upper end of housing 1 by being bolted directly to inwardly disposed flange 2 by bolts 7. Housing 1 is fitted over valve assembly 4 with outwardly disposed flange 3 fitting valve base ring 8 of dome-like valve body 9. Valve body 9, consisting of a single casting, has base ring 8 at its outermost portion. The bottom surface of ring 8 has an axially disposed annular groove 10 containing an O-ring seal, and the top surface of ring 8 extends radially inwardly to an annular shoulder 11, the OD of which fits the ID of the valve housing. Annular groove 12 in shoulder 11 contains a second O-ring seal for sealing between shoulder 11 and the housing. Radially inward, base ring 8 merges into a frustum 13, and frustum 13 merges into cylindrical valve dome 14. Dome 14 has substantial length with oil ports 15 in the wall thereof, and a flat disc 16 of an OD equal to that of the dome is connected thereto in a conventional manner to seal the end of the dome.

A valve slide 18, of about one-and-one-half times the length of the valve dome, snugly encloses the dome. The lower end of slide 18 has an annular groove 19 holding an O-ring seal that seals between the slide and the outer surface of dome 14, and an annular groove 17 about disc 16 holds an O-ring seal for sealing between the disc and an intermediate portion of slide 18. A portion of slide 18 above the dome top or disc 16 has a plurality of oil ports 20, and a guide and piston 21 is mounted on the upper extremity of slide 18 and radially disposed to the valve housing wall to define with the housing an atmospheric chamber 4a and an actuating chamber 4b. Periphery 22 of piston 21 is left thicker than the rest of the piston to provide a wide sliding surface on the valve housing inner wall. A guide 23, in the form of a ring is mounted about the lower extremity of said slide. A plurality of oil ports 24, disposed axially, perforates this ring. The peripheral construction is the same as piston 21. An "oil-in" fitting 25 is placed in the side wall of valve housing 1 in such a way that it is between piston 21 and guide 23 when the slide is covering the dome. This fitting provides a means for actuating the valve.

An orifice selector is mounted below the afore-described valve assembly. This assembly is congregated in a ring-like base 26 that is secured to flange 3 by bolts 26a. The ID of base 26 corresponds to the ID of the cylindrical dome 14 at its base, but it becomes cone-like from a point just above the bottom of said base. This cone-shaped inside surface 27 corresponds substantially to the inside surface of the frustum 13. This cone-like surface terminates into a flat radial surface 28 which has an axially disposed annular groove 29 containing an O-ring seal. Radially outward from this groove, a substantially large annular groove 30 is similarly disposed in an axial plane which serves as a pivotal mounting for rotating plate 31 of the selector, which will be described hereinafter.

Figure 3:
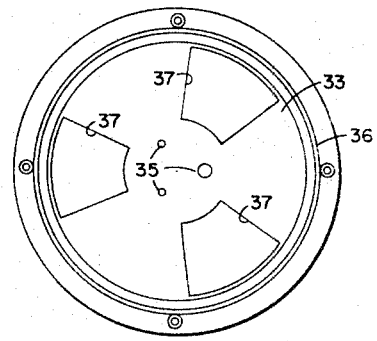
FIGURE 3 shows a stationary disc used in the invention.
Figure 4:
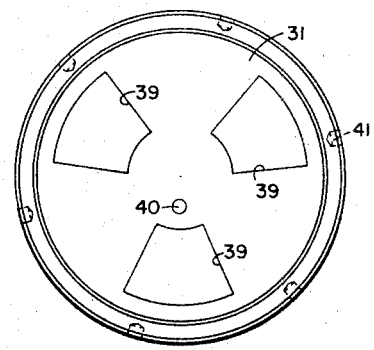
FIGURE 4 shows a rotatable selector disc used in the invention.

Outside wall 32 of annular groove 30 is castellated and extends upward beyond the level of flat surface 28 to the bottom surface of ring 8 to form a circular cavity enclosing a stationary disc plate 33. Plate 33 is held in place by bolts 34 holding it to the underside of the valve-body base ring 11. Three off-center orifices 35 (see FIG. 3) of various sizes disposed axially in plate 33 are designed to match up with orifice 40 (see FIG. 4) in rotating plate 31 below. Orifice 40 is the same size as the larger of orifices 35. The center of orifices 35 is disposed 120 degrees apart in the same circumferential plane. Three large apertures 37 disposed 120 degrees apart but 60 degrees off-set from orifices 35 are designed to match up with identical apertures 39 in lower plate 31. The lower face of plate 33 has an axially disposed annular groove 36 with an O-ring therein for sealing between plates 31 and 33.

Figure 5:
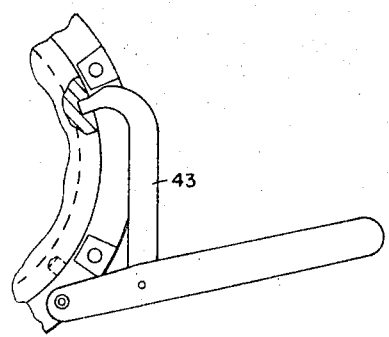
FIGURE 5 shows a spanner wrench and the mounting thereof for rotating the selector disc.

Radially outwardly disposed sockets 41 spaced about 25 degrees apart in rotating plate 31 provide means for a spanner-type wrench 43 (see FIG. 5) to be used to rotate plate 31 in selecting the desired orifice.

The orifice selector assembly is connected to a spring chamber device 45 by a plurality of bolts 46 which secure base 26 to flange 49. Axially downwardly disposed annular groove 48 in the lower surface of base ring 26 contains an O-ring seal which seals between base 28 and flange 49. This spring chamber device 45 is constructed almost as the valve housing described hereinbefore but has a somewhat thicker side wall 50 and a larger diameter than that of the valve housing. A heavy overtravel spiral spring 52 extends the length of the chamber within the spring chamber device. The upper end of said spring holds a flange 53 of a capillary tube bundle 54 against the lower surface of inwardly disposed flange 49, and the lower end of spring 52 rests on an overtravel spring plate 55 which in turn rests against an upper flange 60 of a cylinder 61.

The capillary tube bundle 54, assembled within a cylinder of substantially the same diameter as the ID of the spring, lies axially within the coil of the spring and is held in place by the outwardly disposed flange 53 mentioned above. This tube bundle extends downward from this flange about three-quarters of the length of the spring chamber device 45 and upward of said flange to the point where the selector base ring 26 becomes cone-shaped. An "oil-in" hole 56 in side wall 50 provides a means for pumping oil under the valve.

Spring chamber device 45 is assembled to cylinder 61 by bolts 51 that secure flange 51a of the spring chamber device to flange 60 of cylinder 61. An O-ring seal in annular groove 57 seals between the lower end of wall 50 and flange 60. Cylinder 61 has heavy-side walls with a large port 62 in its lower half for connecting the cylinder to a nitrogen inlet line and a radially outwardly disposed flange 63 about its outer surface for assembling the cylinder to the strain wall below. An annular cut about the lower inside end of cylinder 61 forms two sides of a downwardly disposed annular groove 64. The third and inside surface of groove 64 is provided by a disc like portion 65 fitted within the lower extremity of the cylinder. Groove 64 thus is formed containing an O-ring seal. Disc portion 65 has a central circular opening 66 through which piston rod 70 passes. An inwardly radially disposed groove 67 in opening 66 contains appropriate sealing means for sealing about the rod.

A heavily constructed piston 68 is disposed within cylinder 61, and a reduced portion of rod 70 passes through a properly sealed bore in the piston to a nut 71 that secures rod 70 to the piston. A sleeve-like spacer 72 of approximately one-half the length of cylinder 61 is fitted about connecting rod 70. This spacer 72 restricts piston movement to the upper end of the chamber, insuring clearance of gas inlet 62. The lower skirt of the piston contains a radially outwardly disposed annular groove 73 holding an O-ring seal for sealing between the piston and cylinder wall.

Figure 2B:
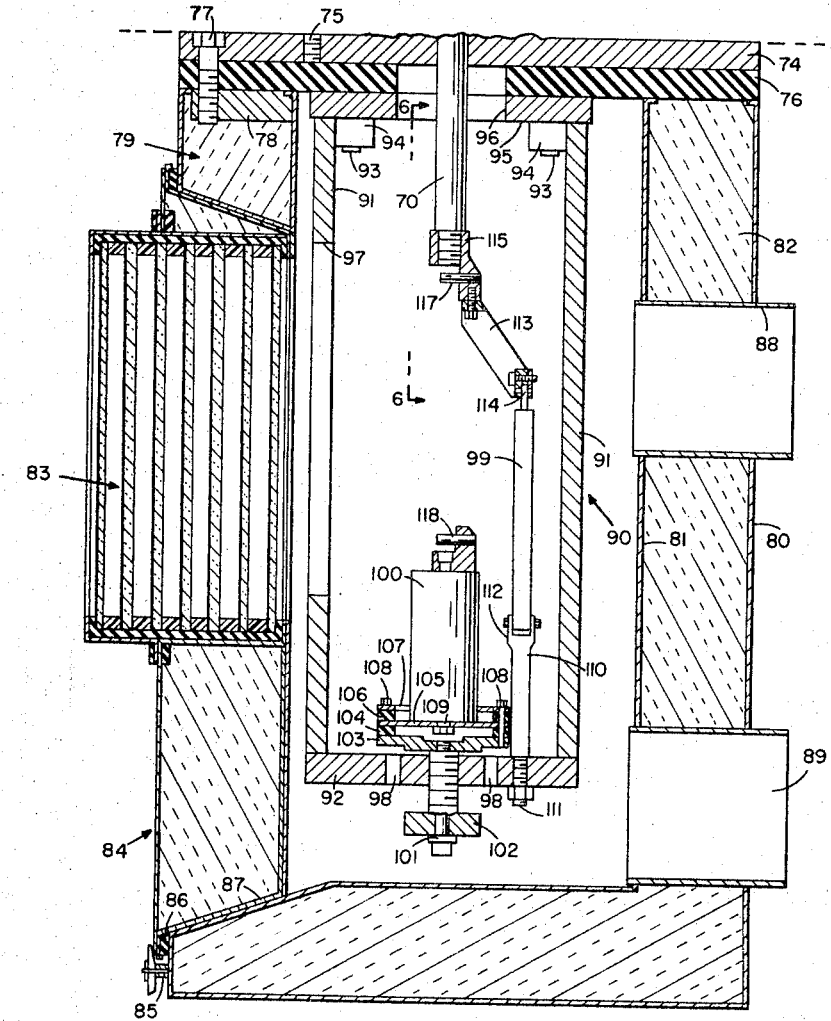
FIGURE 2B is a sectional view showing detailed construction of a specimen-holding box according to this invention.

The afore-described members are assembled as a unit providing means for force generation and related control thereof. Separating these members from a force-measuring and specimen-holding means is an upper strain wall 74 (see FIGURE 2B). This wall is constructed of heavy metal and is a square plate of substantially larger surface area than flange 63 of the cylinder. A circumferential arrangement of threaded bolt holes about the center of this wall receives bolts 75 which hold the cylinder to the upper face of the strain wall. An aperture in its center provides a passage for connecting rod 70. The lower face of the strain wall is covered by a thick layer of cork insulation 76 of substantially the same dimensions as the strain wall. Bolts 77 in each corner of the strain wall pass downwardly from the upper face through the insulation cork layer and into bosses 78 welded in the corners of temperature-control box 79.

Temperature-control box 79 is fabricated from 16-gage steel plate in a rectangular form with one end, the upper end, open. This end is covered by strain wall 74 and cork insulation 76. Outer walls 80 and inner walls 81 are fabricated and assembled so that a large space between said walls can be filled with a moisture-resistant form of insulation material (Santocel) 82. One of the side walls of this enclosure has, for observation of the specimen, a thermal pane 83 mounted in a door 84 of similar construction and thickness as the side walls of said enclosure. This door is hinged on one side and has dogs 85 properly spaced to provide means for sealing it when closed. To accomplish proper sealing, the perimeter of the outer wall of the door has a rubber gasket 86 carried in a groove formed by end plates 87. The side wall opposite the one containing the door has two large circulation ducts 88. This temperature-control box is of sturdy construction so that said box may become the standard upon which the entire assembly is mounted.

A rectangularly shaped strain box 90 is placed inside temperature-control box 79. This strain box 90 is made up of four rectangular sides 91 and a lower strain wall 92 with the upper strain wall 74, described above, covering the upper end. Bosses 94 are welded to the inner surfaces of each corner of the strain box flush with its upper end, and a square plate 95 with an aperture 96 in its center is removably mounted above the strain-box upper end. Bosses 94 receive bolts 93 that pass down through upper strain wall 74 to secure the strain box to strain wall 74. The four side walls 91 are welded together, and the lower strain wall 92 is welded to the lower end. One of these side walls has a window opening 97, centrally disposed to allow the placement of a specimen on the specimen-holding devices and visual observation of said specimen through thermal pane 83. A number of air-circulation ports 98 are placed in the lower strain wall to provide for ample circulation about the specimen.

A potentiometer 99 and strain gage 100 are anchored to the upper side of the lower strain wall. The strain gage is anchored in the center of the strain wall by a vibration-damping mount consisting of an anchor bolt 101 pivotally mounted through an adjustably threaded knob 102 that is set in the lower strain wall. A bracket 103 fitted on the inner end of bolt 101 provides means for assembling a flat ring-like rubber buffer 104, a strain-gage bracket 105, a second identical rubber buffer 106, and a metal ring 107 in the order given. All are held together by bolts 108. The strain-gage bracket is bolted to the center of the cylinder-like body of the strain-gage-assembly lower end 109.

Potentiometer 99 is enclosed in a rod-like members and is pivotally mounted to a pedestal 110 at its lower end. The pedestal is a rod-like member with a through bolt 111 on the lower end and a fork 112 on its upper end. The lower end is bolted to the inside of the lower strain wall off-center and axially aligned with connecting rod 70.

Figure 6:
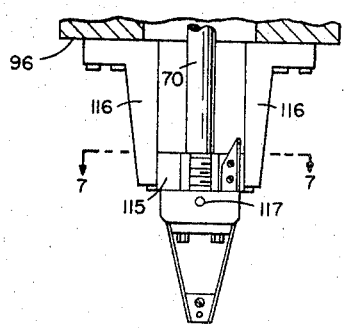
FIGURE 6 is a view taken on line 6—6 of FIGURE 2B and illustrating the grooved guides.
Figure 7:
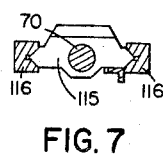
FIGURE 7 is a section view taken on line 7—7 of FIGURE 6.

An arm 113 reaching outwardly, mounted on the lower end of connecting rod 70, retains the upper end 114 of potentiometer 99 in a conventional manner. Forming a base for the mounting of arm 113 is a slide 115 mounted on the lower end of connecting rod 70 and fitted into two grooved guides 116 (see FIGS. 6 and 7). Guides 116 are bolted to square plate 96 on opposite sides of the connecting rod. Slide 115 contains a peg-like specimen connecting means 117, and the upper end of the strain gage provides a similar means 118 for securing the opposite end of the specimen.

Force and strain measuring and recording means for the test specimen is provided by an oscilloscope 120 (see FIG. 1) that is connected by leads 121, 122 to potentiometer 99 and strain gauge 100 respectfully, Polaroid camera 123 is mounted relative to oscilloscope 120 in a conventional manner, and is used to record oscilloscope readings from the oscilloscope.

Referring now to the loading and actuating means for operating the strain generating machinery, a pressurized nitrogen source 124 supplies nitrogen through pressure regulator 125 and control valve 126 to accumulator 127. The nitrogen is communicated from accumulator 127 through supply and exhaust valve 128 to line 129 and control valve 130 for pressurizing sump 131 and to line 132 which is connected to port 62 for pressurizing the under side of piston 68.

Oil-in fitting 25 is connected by conduit 133 through multi-way valve 135, and conduit 137 to sump 131. The suction side of pump 139 is interconnected with another port of multi-way valve 135 by conduit 141 as illustrated. Conduit 143, with check valve 145 therein, interconnects the pressure side of pump 139 with conduit 137, and conduit 147, with check valve 149 therein, interconnects conduit 137 and oil in hole 56.

The following procedure is used in testing a given specimen of material with the high-strain-rate tester described hereinbefore.

Oil is initially pumped from a source through "oil-in" hole 56 to completely fill the spring chamber and drive position 68 to its lower position. Nitrogen is next allowed to flow through port 62 to pressurize the underside of piston 68. Oil-sump tank 131 is then pressurized by opening valve 130 in line 129 leading to the underside of the diaphragm in the sump. The force-generating mechanism is now ready for the test.

A specimen is attached to specimen-holding devices 117, 118 provided in strain box 90 by opening door 84 in the temperature-control box and reaching in through window opening 97 in the side wall of the strain box. When the specimen is in place, door 84 is shut and dogged down, and the temperature in the temperature-control box is regulated to the desired degree. Selector plate 31 (see FIGURE 2A) is set on the desired rate, and the preparations are completed.

The machine is set into action by actuating multi-way valve 135 to interconnect conduits 133 and 137 to communicate fluid pressure from pressurized sump tank 131 to chamber 4b. Fluid pressure in chamber 4b acts on piston 21 and displaces valve slide 18 to open a passage for the oil trapped below valve 4.

The nitrogen pressure, by means of piston 68, forces the oil or non-compressible fluid above piston 68 through capillary bundle 54 whence it is extruded; thus a constant strain rate is obtained.

The upward travel of piston 68 is terminated by contact with the spring-loaded overtravel plate 55.

As force and strain are extended on the test speciman, oscilloscope 120 measures the force and strain thereon, and Polaroid camera 123 records the oscilloscope readings.

After the test is completed, the reset the test apparatus it is necessary to return the oil in chamber 4b through "oil-in" hole 56 to the spring chamber device 45. To do this, the nitrogen pressure is bled from the chamber under piston 68 by adjusting supply and exhaust valve 128. Next multi-way valve 135 is adjusted to interconnect conduits 133 and 141 and allow pump 139 to pump the oil from chamber 4b to the chamber in spring chamber device 45. As the oil is pumped from chamber 4b, atmospheric pressure in chamber 4a acts on piston 21 to reset quick-dump valve assembly 4 to the closed position.

It is to be understood that the form of our invention, herewith shown and described, is to be taken as a preferred example of the same, and that various changes in the size, shape and arrangement of parts may be resorted to, without departing from the spirit of our invention, or the scope of the subjoined claims.

We claim:

1. A high-strain-rate tester including: specimen-holding means for mounting a test specimen; and strain-generating machinery connected to a portion of said specimen-holding means which mounts one end of the test specimen, said strain generating machinery including a piston mounted in a cylinder, with first and second chambers on opposite sides of said piston, fluid pressure means in said first chamber applying a constant moving force to said piston, and non-compressible fluid in said second chamber for limiting movement of said piston, means for providing a constant fluid pressure in said first chamber, a capillary tube bundle mounted relative to said second chamber for allowing said non-compressible fluid to be extruded therethrough, a selector orifice device connected in series with said capillary bundle, and a quick dump valve assembly connected in series with said selector orifice device, said quick dump valve having an inlet and an outlet, means for maintaining a substantially constant pressure at said outlet of said quick dump valve, whereby when said quick dump valve is opened, said non-compressible fluid is instantly released and said fluid pressure means in said first chamber acting on said piston causes said non-compressible fluid to be forced through said capillary bundle, said selector orifice and said quick dump valve to cause a constant high-strain-rate force to be applied to the specimen.

2. A high-strain-rate tester as set forth in claim 1, wherein said selector orifice device includes selector means for selecting orifices of different sizes to provide adjustable strain rates.

3. A high-strain-rate tester as set forth in claim 1, wherein said quick-dump valve includes a cylindrical dome with ports in the wall thereof, a valve slide telescoped over said dome for sealing said ports, and a piston connected to said valve slide for actuating said valve slide to and from a closed position.

References Cited

UNITED STATES PATENTS

| | | | |
|---|---|---|---|
| 2,576,433 | 11/1951 | Wood | 73—97 |
| 2,670,624 | 3/1954 | Faris et al. | 73—15.6 |
| 2,904,993 | 9/1959 | Grover et al. | 73—15.6 |
| 3,057,190 | 10/1962 | Minke | 73—89 |
| 3,282,083 | 10/1966 | Sonderegger | 73—89 |
| 3,338,092 | 8/1967 | Lindholm et al. | 73—95 |

RICHARD C. QUEISSER, *Primary Examiner.*

J. H. WILLIAMSON, *Assistant Examiner.*